US012497828B2

(12) United States Patent
Boyle

(10) Patent No.: US 12,497,828 B2
(45) Date of Patent: Dec. 16, 2025

(54) STRUCTURAL BEAM ASSEMBLY

(71) Applicant: PATIO DESIGNS, LLC, Port Richey, FL (US)

(72) Inventor: Craig Boyle, Port Richey, FL (US)

(73) Assignee: PATIO DESIGNS, LLC, Port Richey, FL (US)

( * ) Notice: Subject to any disclaimer, the term of this patent is extended or adjusted under 35 U.S.C. 154(b) by 256 days.

(21) Appl. No.: 18/230,231

(22) Filed: Aug. 4, 2023

(65) Prior Publication Data

US 2025/0043627 A1 Feb. 6, 2025

(51) Int. Cl.
*E06B 9/52* (2006.01)

(52) U.S. Cl.
CPC .................................... *E06B 9/52* (2013.01)

(58) Field of Classification Search
CPC ........ E04B 1/1906; E04B 1/2403; E04B 1/19; E04B 2001/1957; E06B 9/52
See application file for complete search history.

(56) References Cited

U.S. PATENT DOCUMENTS

| | | | |
|---|---|---|---|
| 1,360,720 A | 11/1920 | Eugene | |
| 1,788,096 A | 1/1931 | Friedemann | |
| 2,620,751 A | 12/1952 | Michael | |
| 3,153,299 A | 10/1964 | Jennings | |
| 3,222,841 A | 12/1965 | Robert | |
| 3,332,197 A | 7/1967 | Hinkle | |
| 3,698,224 A | 10/1972 | Saytes | |
| 3,726,551 A | 4/1973 | Levenberg | |
| 3,831,336 A | 8/1974 | Diemer | |
| 3,856,113 A | 12/1974 | Engvall | |
| 4,027,987 A | 6/1977 | Berkowitz | |
| 4,112,853 A | 9/1978 | Tisbo | |
| 4,323,319 A | 4/1982 | Adams | |
| 4,516,376 A | 5/1985 | King | |
| 4,630,550 A | 12/1986 | Weitzman | |
| 5,553,437 A | 9/1996 | Navon | |
| 5,590,974 A | 1/1997 | Yang | |
| 5,813,641 A | 9/1998 | Baldwin | |
| 5,921,053 A * | 7/1999 | Callahan .................. | E04C 3/07 52/843 |
| 5,997,117 A | 12/1999 | Krietzman | |

(Continued)

FOREIGN PATENT DOCUMENTS

| | | | |
|---|---|---|---|
| EP | 0649949 | A1 | 4/1995 |
| RU | 2680560 | C1 | 2/2019 |

*Primary Examiner* — Beth A Stephan
(74) *Attorney, Agent, or Firm* — Wolter VanDyke Davis PLLC; Erica M. Cipparone

(57) ABSTRACT

An apparatus (100), including: a hollow beam (200) configured to constitute at least part of a screen enclosure and including: plural sides (204, 206, 208, 210); and two spline grooves (204A, 204B, 206A, 206B, 208A, 208B, 210A, 210B) formed in each side of the plural sides. Each spline groove of the two spline grooves extends along a longitudinal axis (250) of the hollow beam and is configured to receive therein a respective screen spline. Each spline groove is formed in part by a respective cantilevered lip (204AL, 204BL, 206AL, 206BL, 208AL, 208BL, 210AL, 210BL) that extends along the longitudinal axis of the hollow beam and each cantilevered lip is configured to cooperate with the respective screen spline to trap screen therein. The respective lips cantilever in opposite directions.

19 Claims, 6 Drawing Sheets

(56) References Cited

U.S. PATENT DOCUMENTS

| | | | | |
|---|---|---|---|---|
| 6,082,070 | A | 7/2000 | Jen | |
| 6,405,504 | B1 | 6/2002 | Richardson | |
| 6,412,250 | B2 | 7/2002 | Davis | |
| 6,601,362 | B1 | 8/2003 | Prince | |
| 6,668,495 | B1 * | 12/2003 | Prince | E04F 19/022 52/656.1 |
| 6,941,719 | B2 | 9/2005 | Busseuil | |
| 7,628,563 | B2 | 12/2009 | Winkler | |
| 8,065,855 | B2 | 11/2011 | Wood | |
| 9,951,802 | B2 | 4/2018 | Keller | |
| D830,545 | S * | 10/2018 | Loughren | D24/126 |
| 10,640,968 | B2 * | 5/2020 | Teffenhart, Jr. | E04B 1/2403 |
| 10,738,457 | B1 | 8/2020 | Hendry | |
| D954,301 | S * | 6/2022 | Hendry | D25/131 |
| D989,354 | S * | 6/2023 | Kendall | D25/123 |
| D991,493 | S * | 7/2023 | Hickey | D25/126 |
| D1,053,387 | S * | 12/2024 | Hickey | D25/199 |
| 2002/0053179 | A1 | 5/2002 | Wycech | |
| 2003/0145555 | A1 * | 8/2003 | Raskin | E04C 3/40 52/844 |
| 2006/0021697 | A1 | 2/2006 | Riley | |
| 2006/0070340 | A1 | 4/2006 | Fanucci | |
| 2007/0040293 | A1 | 2/2007 | Lane | |
| 2007/0137134 | A1 | 6/2007 | Plagemann | |
| 2007/0266671 | A1 * | 11/2007 | Chromy | E04C 3/06 52/844 |
| 2009/0007520 | A1 | 1/2009 | Navon | |
| 2010/0132285 | A1 | 6/2010 | Wood | |
| 2011/0156443 | A1 | 6/2011 | Schneider | |
| 2017/0097030 | A1 | 4/2017 | Keller | |
| 2019/0390453 | A1 | 12/2019 | Teffenhart, Jr. | |
| 2024/0043094 | A1 * | 2/2024 | Huiskamp | B63B 35/44 |

* cited by examiner

STRUCTURAL BEAM ASSEMBLY

FIELD OF THE INVENTION

The invention relates to screen enclosures generally, and in particular, to a structural beam assembly that is a component of a screen enclosure.

BACKGROUND OF THE INVENTION

Screen enclosures have achieved considerable popularity among residential homeowners who enjoy experiencing warm sun and cool breezes of the outdoors without the attendant flies, mosquitoes and other flying insects. A significant number of homes built in warm climates, for instance, will have some form of screen enclosure whether it be a porch, patio or swimming pool area. A majority of such enclosures are constructed of extruded metal framing members including vertical posts/columns, diagonal overhead beams and horizontal cross-bracing purlins and floor-mounted base members. Such extruded metal framing members often include at least one groove for retaining the screening material which is held in place using a flexible strip of rubber, typically circular or square in cross-section, called a “spline”. The groove, therefore, is referred to a as a “spline groove”.

Conventional beams are typically rectangular and have two narrow sides that are opposite each other and two wide sides that are opposite each other and that connect the narrow sides. The beams are usually installed with the wide sides vertically oriented and the narrow sides on the top and bottom to provide the greatest structural strength against gravity. The spline grooves are typically located on the narrow sides and extend along the length of the beam. The screens are usually secured to the spline grooves on the top narrow side and extend laterally.

While this arrangement has proven itself useful, there is room in the art for improvement.

BRIEF DESCRIPTION OF THE DRAWINGS

The invention is explained in the following description in view of the drawings that show.

DETAILED DESCRIPTION OF THE INVENTION

The Inventor has devised a unique and innovative structural beam assembly that improves on the conventional structural beams. The structural beam assembly includes a hollow beam that provides more ways to connect various screen panels thereto. This obviates the need to assemble various beams together to achieve the configurations that are often required. In addition, the structural beam assembly includes a hollow beam and a web beam. The hollow beam can be used by itself or in conjunction with the web beam. The web beam fits within and engages with the hollow beam in a geometrically cooperating manner. The web beam can be used as a connector between two hollow beams and/or as a structural support web for the hollow beam. When used together, the hollow beam and web beam provide sufficient rigidity to enable the beam to span greater distances than conventional beams. This, in turn, allows for fewer support posts in the design of the screen enclosure, which provides for larger, uninterrupted views through the screen enclosure.

Figure 1:
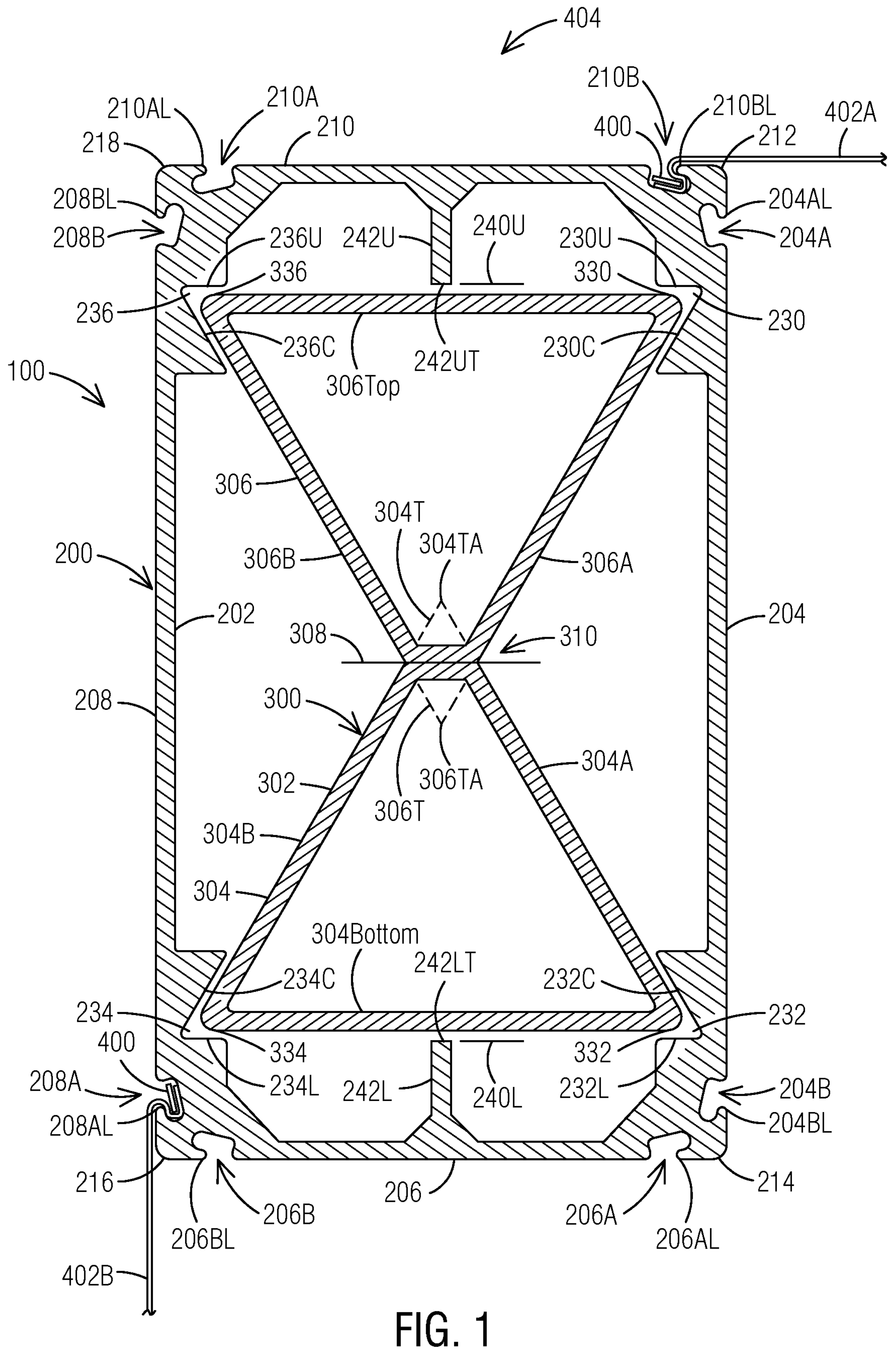
FIG. 1 is a cross sectional view of an example embodiment of a structural beam assembly disclosed herein.

FIG. 1 is a cross sectional view of an example embodiment of the structural beam assembly 100, including an example embodiment of the hollow beam 200 and an example embodiment of the web beam 300, both of which are suitable for use in a screen enclosure. The web beam 300 is configured to slide into the hollow beam 200 and to provide structural support to the hollow beam 200. An interior shape 202 of the hollow beam 200 is configured to match at least a portion of an exterior shape 302 of the web beam 300.

Figure 2:
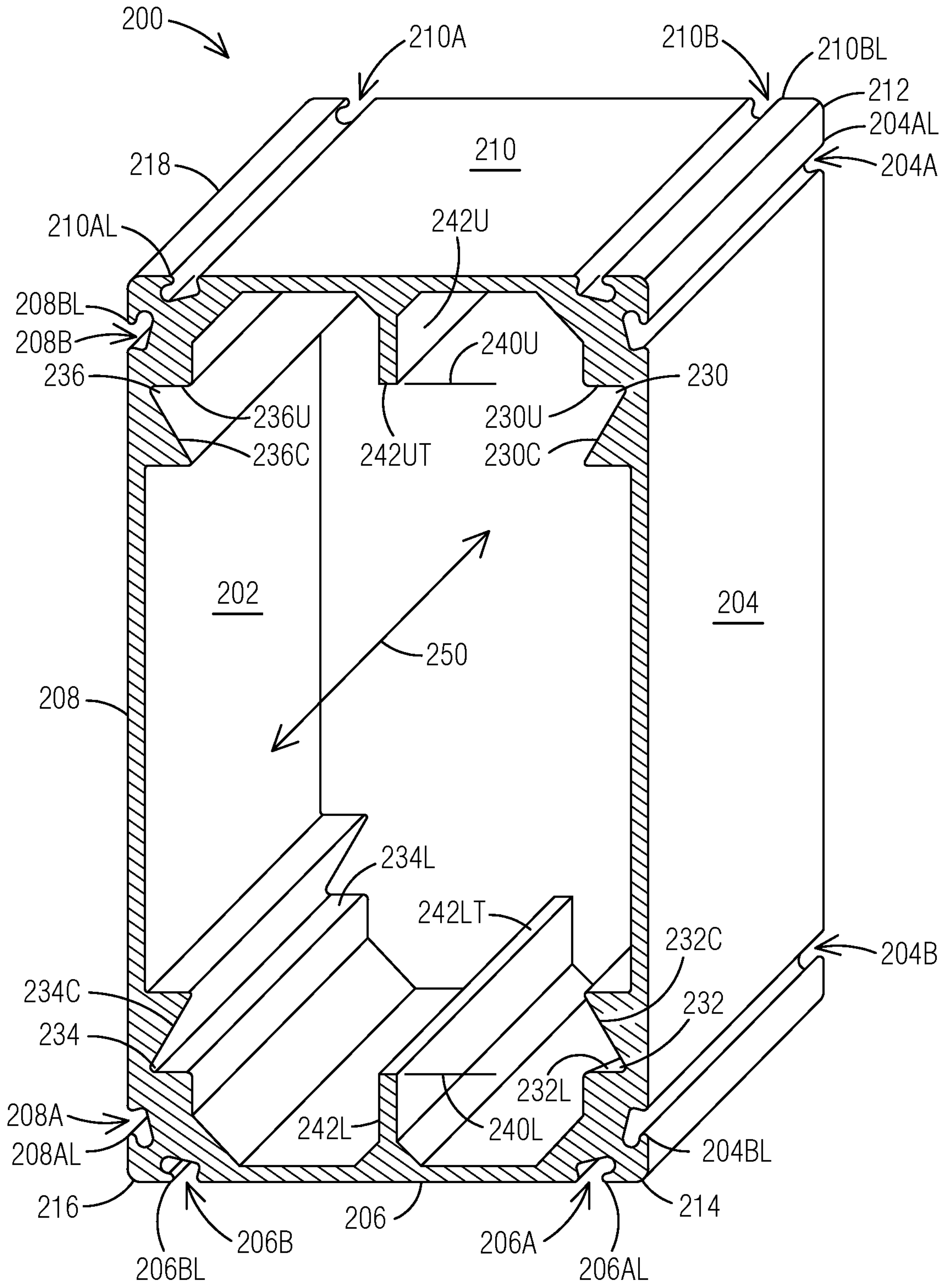
FIG. 2 is a perspective view of an example embodiment of a hollow beam of the structural beam assembly of FIG. 1.
Figure 3:
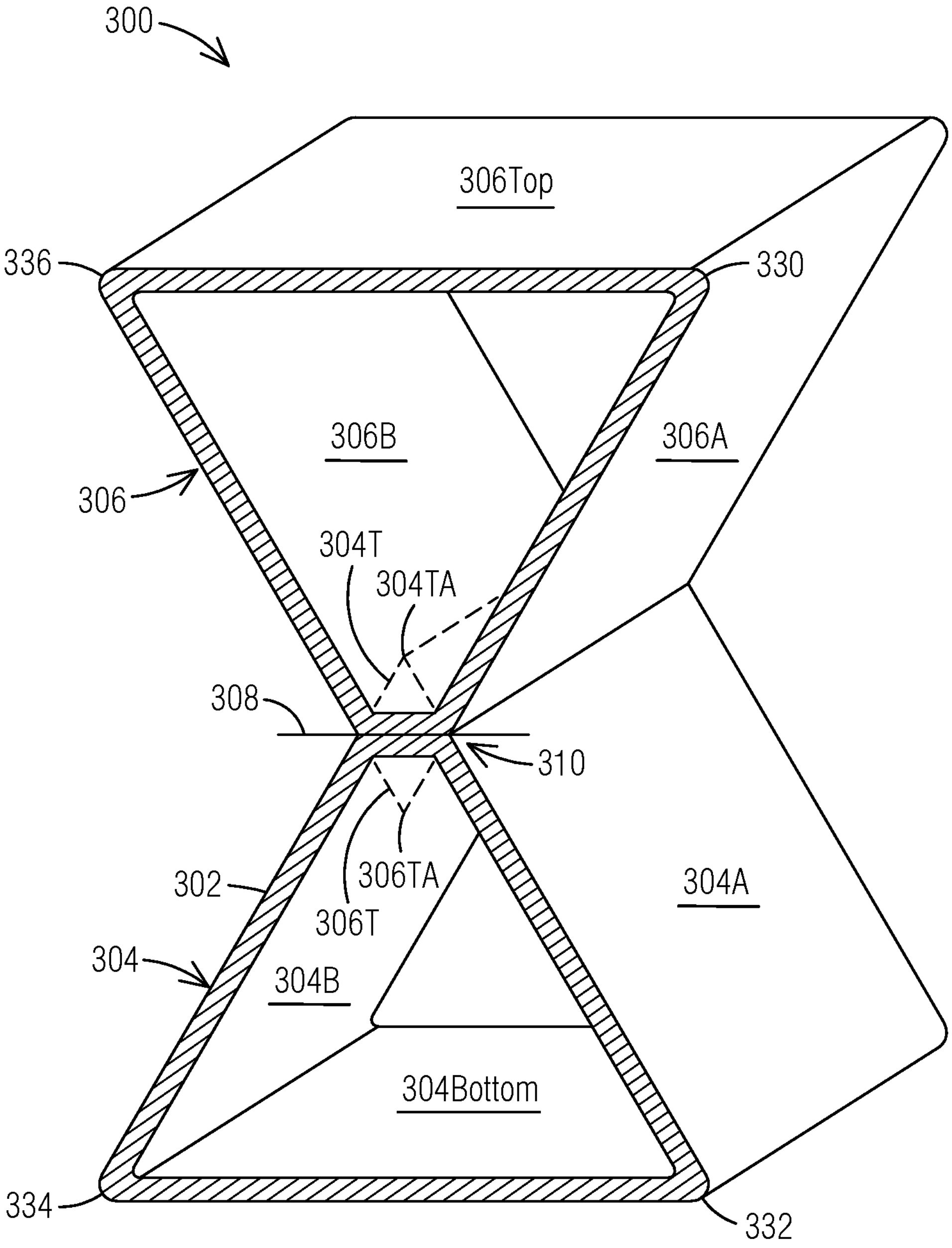
FIG. 3 is a perspective view of an example embodiment of a web beam of the structural beam assembly of FIG. 1.

FIG. 2 is a perspective the hollow beam 200 and FIG. 3 is a perspective view of the web beam 300.

As can be seen via at least FIG. 1 to FIG. 3, the hollow beam 200 is configured to constitute at least part of a screen enclosure and includes: plural sides 204, 206, 208, 210 and four corners 212, 214, 216, 218 that are formed by respective sides 204, 206, 208, 210. Two spline grooves 204A, 204B are formed in side 204. Two spline grooves 206A, 206B are formed in side 206. Two spline grooves 208A, 208B are formed in side 208. Two spline grooves 210A, 210B are formed in side 210. Each spline groove 210A, 210B extends along a longitudinal axis 250 of the hollow beam 200 and is configured to receive therein a respective screen spline 400. As is known in the art, the screen spline can be a rubber strip that is pressed into the spline groove over an edge of the screen to retain the edge of the screen in the spline groove.

Each spline groove is formed in part by a respective cantilevered lip 204AL, 204BL, 206AL, 206BL, 208AL, 208BL, 210AL, 210BL that extends along the length (along the longitudinal axis 250) of the hollow beam 200. In an example embodiment, some or all of the cantilevered lips extend along the longitudinal axis 250 and are parallel to each other. Each cantilevered lip is configured to cooperate with the respective screen spline to trap the edge of the screen therein. The cantilevered lips 204AL, 204BL formed in side 204 cantilever in opposite directions. In this example embodiment, they cantilever towards each other. Likewise, cantilevered lips 206AL, 206BL cantilever in opposite directions towards each other, as do cantilevered lips 208AL, 208BL, and 210AL, 210BL.

In an example embodiment, corner 212 is disposed midway between spline grooves 204A, 204B. Similarly, corner 214 is disposed midway between spline grooves 206A, 206B, corner 216 is disposed midway between spline grooves 208A, 208B, and corner 218 is disposed midway between spline grooves 210A, 210B. Stated another way, corner 212 is straddled by respective spline grooves 204A and 210B, corner 214 is straddled by respective spline grooves 204B and 206A, corner 216 is straddled by respective spline grooves 206B and 208A, and corner 218 is straddled by respective spline grooves 208B and 210A.

Figure 5:
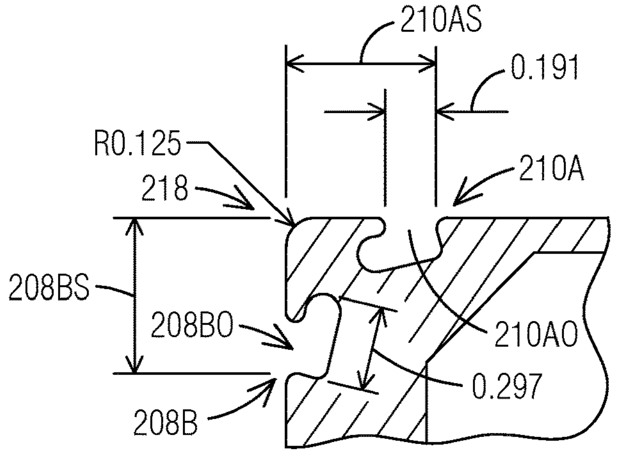
FIG. 5 is a cross sectional view of a corner of the hollow beam of the structural beam assembly of FIG. 1.

As can be seen in FIG. 5, which shows a closeup of corner 218, openings 208BO, 210AO of the spline grooves 208B, 210A are disposed at a setback distance 208BS, 210AS from the corner. In an example embodiment, the setback distances 208BS, 210AS are each one inch or less. In an example embodiment, the other corners 212, 214, 216 are configured like corner 218.

In the example embodiment shown and when the structural beam assembly 100 is oriented as shown in FIG. 1, the web beam 300 includes a hollow rectilinear hourglass shape 302 that includes a hollow triangular bottom half 304 and a hollow triangular upper half 306 that is symmetric with the hollow triangular bottom half 304 about a line of symmetry 308, (though they need not be symmetric about the line of symmetry 308, or even symmetric).

The hollow triangular bottom half 304 includes a first side 304A, a second side 304B, and a bottom 304Bottom. The hollow triangular upper half 306 includes a first side 306A, a second side 306B, and a top 306Top.

The first side 304A, the second side 304B, and the bottom 304Bottom of the hollow triangular bottom half 304 define a triangle 304T. In the example embodiment shown, an apex 304TA of the triangle 304T is disposed above the line of symmetry 308.

The first side 306A, the second side 306B, and the top 306Top of the hollow triangular upper half 306 define a triangle 306T. In the example embodiment shown, an apex 306TA of the triangle 306T is disposed below the line of symmetry 308.

In this example embodiment, the hollow triangular bottom half 304 defines a truncated triangular shape and the hollow triangular upper half 306 likewise defines a truncated triangular shape. The line of symmetry 308 is disposed in a common section 310 that connects the first side 304A and the first side 306A to the second side 304B and the second side 306B. The common section 310 thereby joins the hollow triangular bottom half 304 with the hollow triangular upper half 306.

In alternate example embodiment, the apex 304TA of the triangle 304T may be disposed below the line of symmetry 308 and the apex 306TA of the triangle 306T may be disposed above the line of symmetry 308. In such an example embodiment, the apex 304TA may be connected to apex 306TA via an intervening web/link (not shown) such as a plate etc.

In another alternate example embodiment, the apex 304TA of the triangle 304T and the apex 306TA of the triangle 306T may meet at the same point/location. In such an example embodiment, the hollow triangular bottom half 304 and the hollow triangular upper half 306 each define a full triangle.

The web beam 300 further includes four convex outer corners 330, 332, 334, 336. Corner 330 is formed by the top 306Top and the first side 306A. Corner 336 is formed by the top 306Top and the second side 306B. Corner 332 is formed by the bottom 304Bottom and the first side 304A. Corner 334 is formed by the bottom 304Bottom and the second side 304B.

The hollow beam 200 includes four concave inner corners 230, 232, 234, 236 that each at least partly match a shape of and cradle a respective convex outer corner of the four convex outer corners 330, 332, 334, 336.

When the structural beam assembly 100 is oriented as shown in FIG. 1, concave upper corner 230 is configured to receive convex upper corner 330. Concave upper corner 236 is configured to receive convex upper corner 336. Concave lower corner 232 is configured to receive convex lower corner 332. Concave lower corner 234 is configured to receive convex lower corner 334.

Concave upper corner 230 includes an upper surface 230U configured to contact the top 306Top of the hollow triangular upper half 306 and a canted surface 230C configured to contact the first side 306A of the hollow triangular upper half 306. In an example embodiment, the upper surface 230U and the canted surface 230C are flat.

Concave upper corner 236 includes an upper surface 236U configured to contact the top 306Top of the hollow triangular upper half 306 and a canted surface 236C configured to contact the second side 306B of the hollow triangular upper half 306. In an example embodiment, the upper surface 236U and the canted surface 236C are flat.

In an example embodiment, the upper surface 230U and the upper surface 236U are coplanar in an upper plane 240U and are configured to simultaneously contact the top 306Top of the hollow triangular upper half 306.

Concave lower corner 232 includes a lower surface 232L configured to contact the bottom 304Bottom of the hollow triangular bottom half 304 and a canted surface 232C configured to contact the first side 304A of the hollow triangular bottom half 304. In an example embodiment, the lower surface 232L and the canted surface 232C are flat.

Concave lower corner 234 includes a lower surface 234L configured to contact the bottom 304Bottom of the hollow triangular bottom half 304 and a canted surface 234C configured to contact the second side 304B of the hollow triangular bottom half 304. In an example embodiment, the lower surface 234L and the canted surface 234C are flat.

In an example embodiment, the lower surface 232L and the lower surface 234L are coplanar in a lower plane 240L and are configured to simultaneously contact the bottom 304Bottom of the hollow triangular bottom half 304.

In an example embodiment, the hollow beam 200 includes an upper interior rib 242U that extends longitudinally (along longitudinal axis 250) along the upper side 210 of the hollow beam 200. The upper interior rib 242U protrudes inward from the upper side 210 and terminates at an upper interior rib terminus 242UT that is coplanar with the upper plane 240U. In this example embodiment, the upper interior rib terminus 242UT, the upper surface 230U, and the upper surface 236U are coplanar in an upper plane 240U and are configured to simultaneously contact the top 306Top of the hollow triangular upper half 306.

The upper interior rib 242U thereby provides a structural load path/support between the upper side 210 of the hollow beam 200 and the top 306Top of the web beam 300 while enabling the structure of the hollow beam 200 that is necessary to accommodate the spline grooves 204A, 208B, 210A, 210B.

In an example embodiment, the hollow beam 200 includes a lower interior rib 242L that extends longitudinally along the lower side 206 of the hollow beam 200. The lower interior rib 242L protrudes inward from the lower side 206 and terminates at a lower interior rib terminus 242LT that is coplanar with the lower plane 240L. In this example embodiment, the lower interior rib terminus 242LT, the lower surface 232L, and the lower surface 234L are coplanar in the lower plane 240L and are configured to simultaneously contact the bottom 304Bottom of the hollow triangular bottom half 304.

The lower interior rib 242L thereby provides a structural load path/support between the lower side 206 of the hollow beam 200 and the bottom 304Bottom of the web beam 300 while enabling the structure of the hollow beam 200 that is necessary to accommodate the spline grooves 204B, 206A, 206B, 208A.

When subjected to a vertical downward load, the structural beam assembly 100 as oriented in FIG. 1 is configured to resist the vertical load primarily via the sides 204, 208, the upper interior rib 242U, the lower interior rib 242L, the first side 304A and the second side 304B of the hollow triangular bottom half 304, and the first side 306A and the second side 306B of the hollow triangular upper half 306. Having so many aspects of the structure available to resist the vertical downward load provides superior strength and reduced deflection. This, in turn, allows for longer spans of the structural beam assembly 100 between vertical support posts.

When subjected to a horizontal load, the structural beam assembly 100 as oriented in FIG. 1 is configured to resist the horizontal load primarily via the sides 206, 210, the first side 304A and the second side 304B of the hollow triangular bottom half 304, the first side 306A and the second side 306B of the hollow triangular upper half 306, the bottom 304Bottom of the hollow triangular bottom half 304, the top 306Top of the hollow triangular upper half 306, and the common section 310. Having so many aspects of the structure available to resist the horizontal load provides superior strength and reduced deflection. Here again, this allows for longer spans of the structural beam assembly 100.

One configuration enabled by the hollow beam 200 disclosed herein is shown in FIG. 1. A first screen panel 402A is retained in the spline groove 21B in the corner 212 and extends laterally to the right from the spline groove, horizontally or at an upward angle. The first screen panel 402A may be used as a roof section of a screen enclosure. A second screen panel 402B is retained in the spline groove 208A in the corner 216 and extends downward, vertically or at a downward angle. The second screen panel 402B may be used as a side of the screen enclosure. The hollow beam 200 thereby provides, by itself, a structural connection between a roof screen panel 402A and a side screen panel 402B. One or more hollow beams 200 or structural beam assemblies 100 together with one or more screen panels 402A, 402B can constitute a screen enclosure 404.

Figure 4:
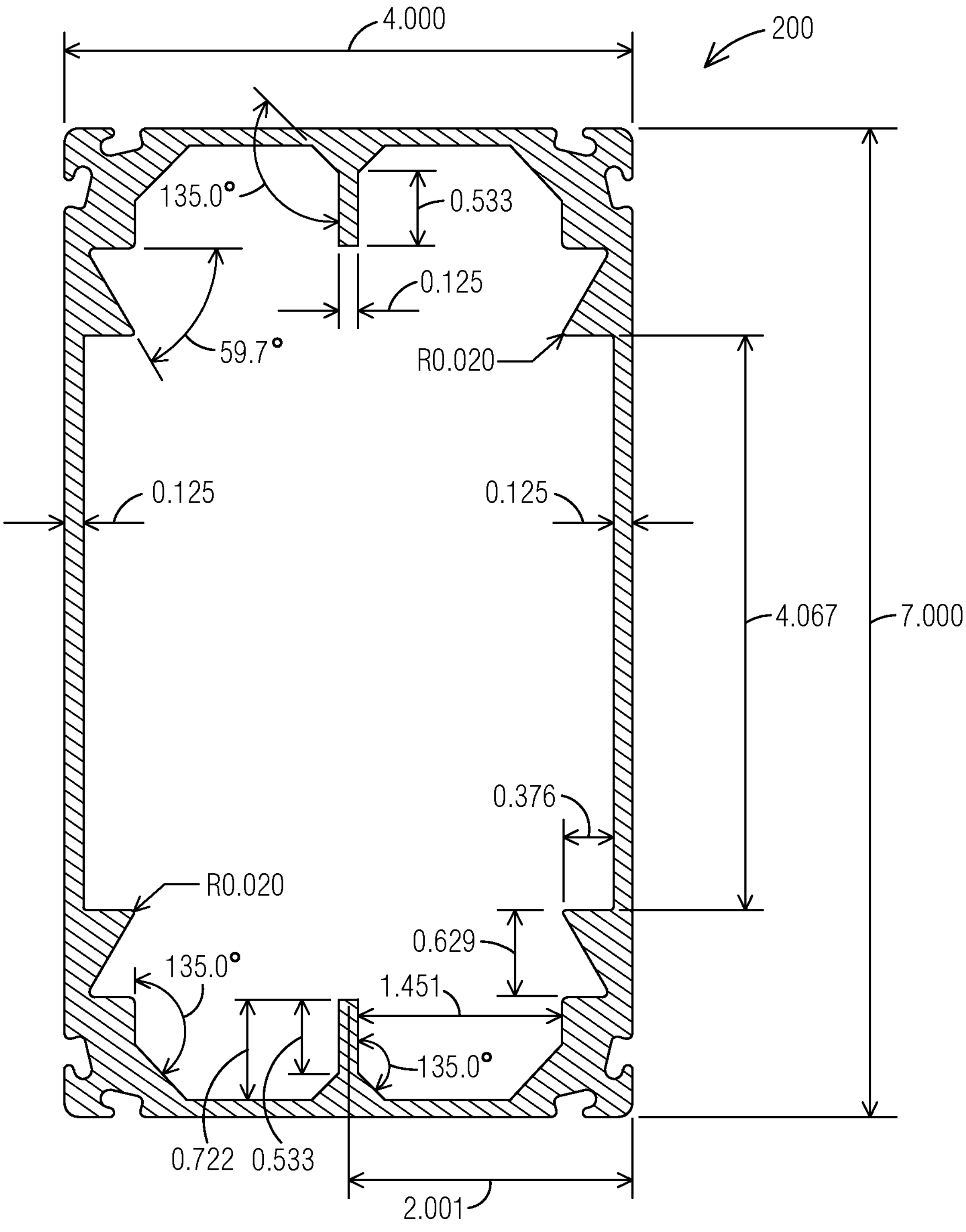
FIG. 4 is a cross sectional view of the hollow beam of the structural beam assembly of FIG. 1.
Figure 6:
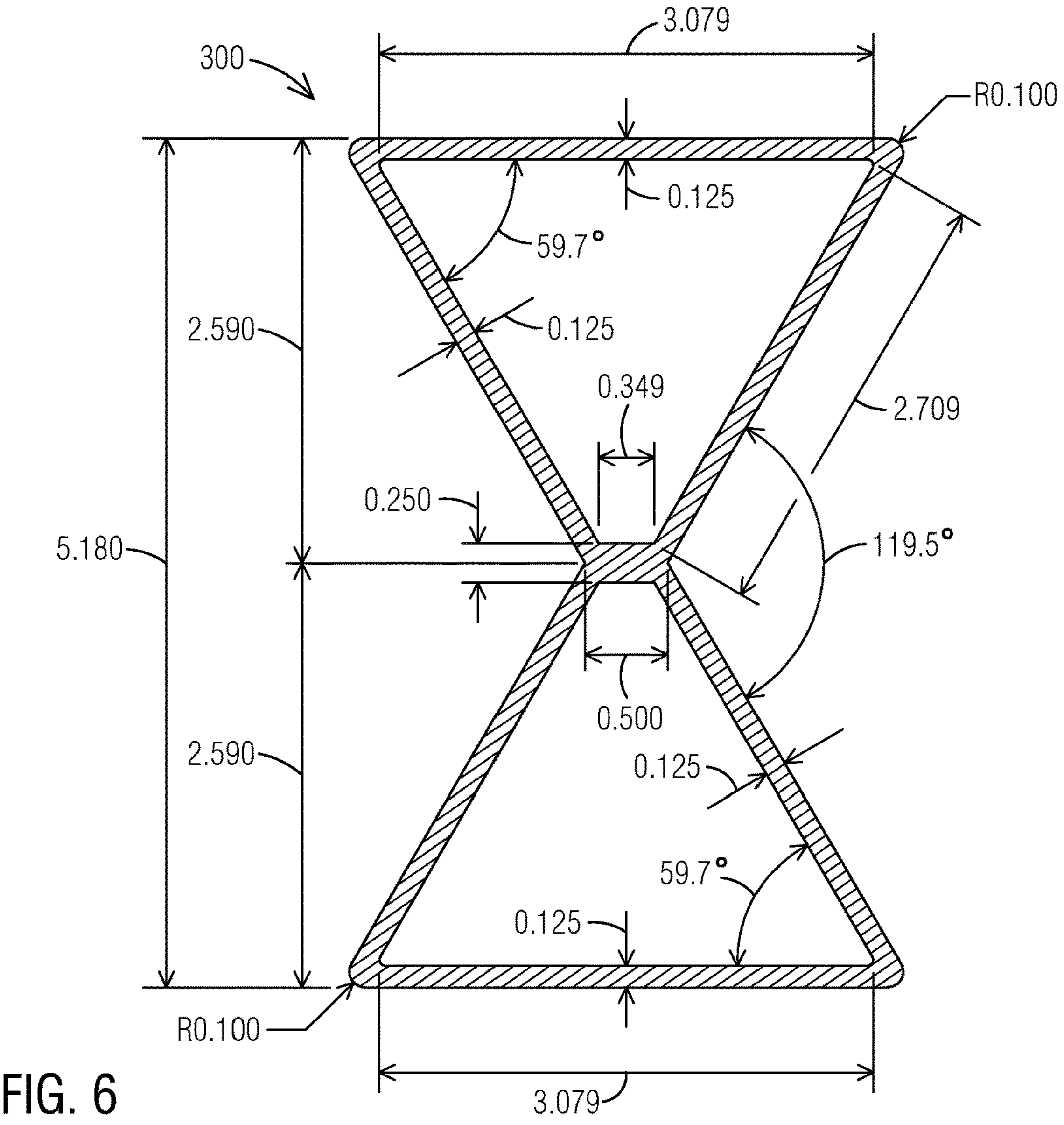
FIG. 6 is a cross sectional view of the web beam of the structural beam assembly of FIG. 1.
Figure 7:
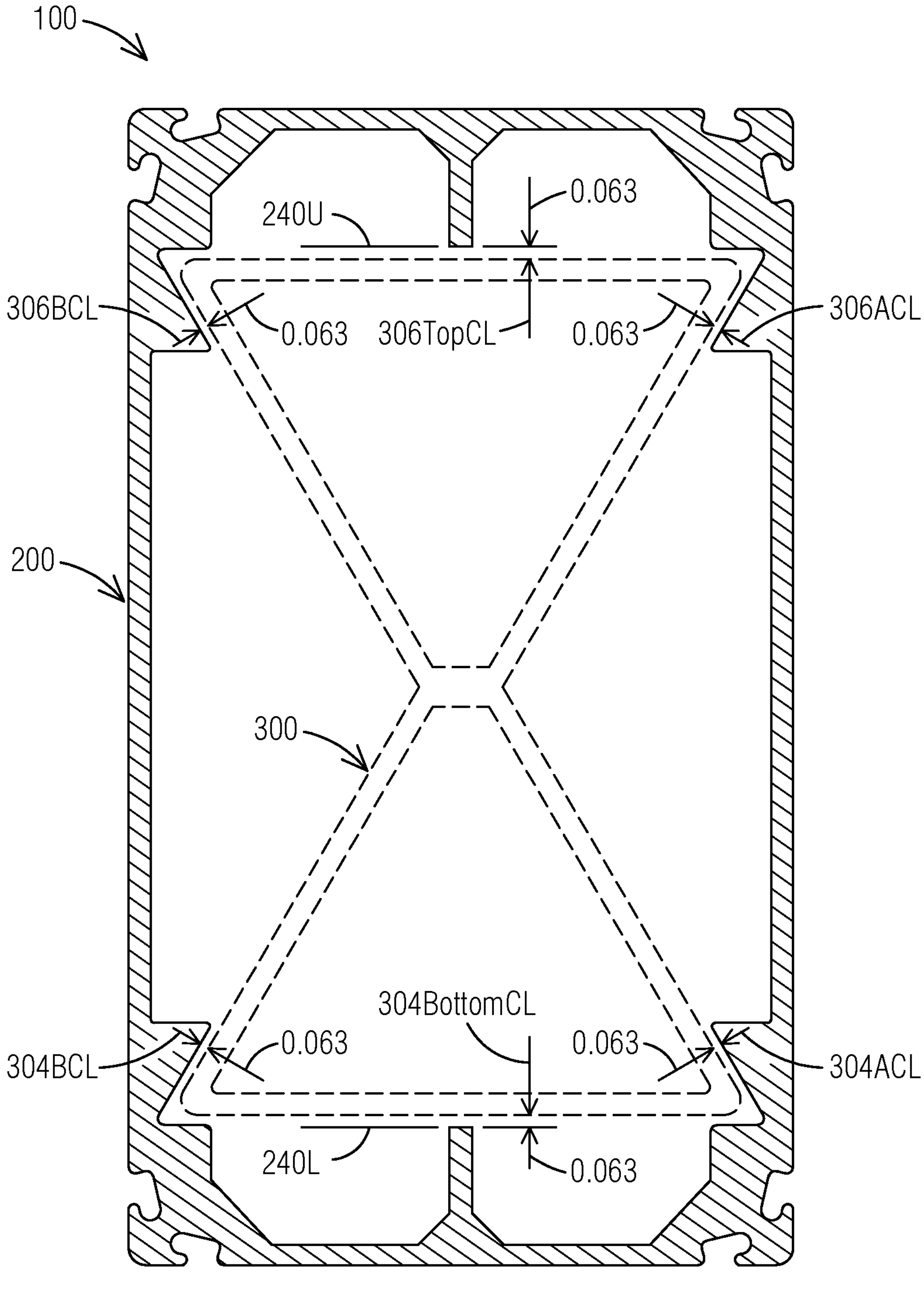
FIG. 7 is another cross-sectional view of the structural beam assembly of FIG. 1.

FIG. 4 and FIG. 5 show dimensions for various features of the hollow beam 200 shown in FIG. 1 and FIG. 2. FIG. 6 shows dimensions for various aspects of the web beam 300 shown in FIG. 1 and FIG. 3. FIG. 7 shows dimensions for various features of the hollow beam 200 when assembled together with the web beam 300. These dimensions are exemplary only and may be adjusted as necessary. An example tolerance for wall thickness is plus or minus ten percent. An example tolerance for angles shown is plus or minus two degrees. However, greater or lesser tolerances may be used.

As can be seen in FIG. 7, a clearance may exist between the external surfaces of the web beam 300 and the internal surfaces of the hollow beam 200. Clearance 304BottomCL is present between the bottom 306Bottom and the lower plane 240L, and clearance 306TopCL is present between the top 306Top and the upper plane 240U. Clearances 304ACL, 304BCL, 306ACL, 306BCL may be present between the respective portions of the web beam 300 and the associated interior features of the hollow beam 200.

These clearances may be present to allow for relatively easy insertion of the web beam 300 even if there exists a minor sag along the longitudinal axis 250 of the hollow beam 200. Some, none, or all of these clearances may be present. In addition, while the clearances shown in this example embodiment are all equal to each other, they need not be. There may be as many different values for the clearances as there are clearances.

The hollow beam 200 and the web beam 300 may be made from any material deemed suitable. Suitable materials include aluminum, stainless steel, carbon steel, polymers, and the like understood to be suitable by the artisan.

The hollow beam 200 provides more ways to connect various screen panels. This, in turn, allows greater flexibility in design of the screen enclosure. The hollow beam 200 can be used alone or can be assembled together with the web beam 300 to form the structural beam assembly 100. The structural beam assembly 100 provides improves vertical and lateral strength and this, in turn, allows for greater beam spans with reduced need for vertical posts. Greater beam spans allow for an improved view due to fewer visual obstructions/distractions. The web beam 300 provides a unique geometry that provides additional vertical and lateral strength. Consequently, the disclosure represents an improvement in the art.

While various embodiments of the present invention have been shown and described herein, it will be obvious that such embodiments are provided by way of example only. Numerous variations, swapping of features among embodiments, changes, and substitutions may be made without departing from the invention herein. Accordingly, it is intended that the invention be limited only by the spirit and scope of the appended claims.

The invention claimed is:

1. An apparatus, comprising:

a hollow beam configured to constitute at least part of a screen enclosure and comprising: plural sides; and two spline grooves formed in each side of the plural sides;

wherein each spline groove of the two spline grooves extends along a longitudinal axis of the hollow beam and is configured to receive therein a respective screen spline;

wherein each of the spline grooves is formed in part by a respective cantilevered lip that extends along the longitudinal axis of the hollow beam and each of the cantilevered lips is configured to cooperate with the respective screen spline to trap a screen therein;

wherein the respective lips cantilever in opposite directions; and a first interior rib that extends longitudinally along a first of the plural sides and that protrudes inward from the first of the plural sides; and a first interior corner that extends longitudinally and a see interior corner extends longitudinally: wherein the first interior rib is disposed between the first interior corner and the second interior corner: wherein the first interior corner and the second interior corner are each at least partly d by a respective lower surface; and wherein a first rib terminus of the first interior rib and the lower surfaces are all disposed at a same distance from the first of the plural sides.

2. The apparatus of claim 1, further comprising a second interior rib that extends longitudinally along a second of the plural sides and that protrudes inward from the second of the plural sides, wherein the first interior rib and the second interior rib are disposed opposite each other.

3. The apparatus of claim 1, wherein the two spline grooves each extend parallel to the longitudinal axis and thereby extend parallel to each other.

4. The apparatus of claim 1, wherein the hollow beam comprises plural longitudinally extending corners, each of the corners being formed by respective adjacent sides of the plural sides, and wherein each corner is disposed midway between a first of the spline grooves disposed on a first of the respective adjacent sides and a second of the spline grooves disposed on a second of the respective adjacent sides.

5. The apparatus of claim 4 wherein an opening of the first of the spline grooves and an opening of the second of the spline grooves are both disposed at a setback distance from the corners of one inch or less.

6. The apparatus of claim 1, further comprising:

a web beam configured to slide into the hollow beam and to provide structural support to the hollow beam upon deflection of the hollow beam;

wherein the hollow beam comprises an interior shape that is configured to match at least a portion of an exterior shape of the web beam.

7. The apparatus of claim 6, wherein the web beam comprises a rectilinear hourglass shape comprising four convex outer corners; and wherein the interior shape of the hollow beam comprises four concave inner corners that each match a shape of and cradle a respective convex outer corner of the four convex outer corners.

8. The apparatus of claim 1, further comprising a screen enclosure comprising the hollow beam.

9. The apparatus of claim 1, wherein in a sectional view looking along the longitudinal axis, the first interior rib is centrally disposed on the first of the plural sides.

10. An apparatus, comprising:

a web beam comprising a rectilinear hourglass shape comprising a hollow triangular bottom half and a hollow triangular upper half that are symmetric about a line of symmetry;

wherein an apex of a triangle defined by the triangular bottom half is disposed at or above the line of symmetry, and an apex of a triangle defined by the triangular upper half is disposed at or below the line of symmetry;

wherein each side of the triangular bottom half forms a respective convex corner with a bottom of the triangular bottom half; and wherein each side of the triangular upper half forms a respective convex corner with a top of the triangular upper half.

11. The apparatus of claim 10, wherein the triangular bottom half comprises a truncated triangular shape, wherein the triangular upper half comprises a truncated triangular shape, and wherein a common section is formed at the line of symmetry where the triangular bottom half and the triangular upper half are joined.

12. The apparatus of claim 10, further comprising:

a hollow beam;

wherein the web beam is configured to slide into the hollow beam and to provide structural support for the hollow beam upon deflection of the hollow beam; and wherein the hollow beam comprises an interior shape that is configured to match and cradle at least: the convex corners between each of the sides of the triangular bottom half and the bottom of the triangular bottom half; and the convex corners between each of the sides of the triangular upper half and the top of the triangular upper half.

13. The apparatus of claim 12, wherein the hollow beam further comprises:

plural longitudinally extending corners, each of the corners being formed by respective adjacent sides of the hollow beam; and for each corner, a first spline groove that extends parallel to the corner and that is disposed on a first of two respective adjacent sides that form the corner, and a second spline groove that extends parallel to the corner and that is disposed on a second of the respective adjacent sides that form the corner.

14. An apparatus, comprising:

a hollow beam comprising plural sides and configured to constitute at least part of a screen enclosure; and a web beam configured to slide into the hollow beam and to provide structural support to the hollow beam, the web beam comprising a hollow rectilinear hourglass shape comprising four convex outer corners;

wherein an interior shape of the hollow beam comprises four concave inner corners that each match a shape of and cradle a respective convex outer corner of the four convex outer corners.

15. The apparatus of claim 14, wherein the four concave inner corners comprise: two upper concave inner corners configured to receive two upper convex outer corners of the four convex outer corners; and two lower concave inner corners configured to receive two lower convex outer corners of the four convex outer corners;

wherein the two upper concave inner corners each comprise a respective upper flat surface, and wherein the respective upper flat surfaces are both coplanar in an upper plane;

wherein the hollow beam comprises an upper interior rib that extends longitudinally along an upper side of the hollow beam and that protrudes inward from the upper side and terminates at the upper plane; and wherein the upper flat surfaces and the upper interior rib are configured to simultaneously contact a top of the web beam.

16. The apparatus of claim 15, wherein the two lower concave inner corners each comprise a respective lower flat surface, and wherein the respective lower flat surfaces are both coplanar in a lower plane;

wherein the hollow beam comprises a lower interior rib that extends longitudinally along a lower side of the hollow beam, that protrudes inward from the lower side, and terminates at the lower plane; and wherein the lower flat surfaces and the lower interior rib are configured to simultaneously contact a bottom of the web beam.

17. The apparatus of claim 14, wherein the hollow beam further comprises plural longitudinally extending corners, each of the corners being formed by respective adjacent sides of the plural sides, and wherein each corner is straddled by a respective pair of spline grooves comprising:

a first of the spline grooves disposed on a first of the respective adjacent sides; and a second of the spline grooves disposed on a second of the respective adjacent sides.

18. The apparatus of claim 17, wherein an opening of the first of the spline grooves and an opening of the second of the spline grooves are both disposed at a setback distance from the corners of one inch or less.

19. The apparatus of claim 14, further comprising a screen enclosure comprising the hollow beam and the web beam.

* * * * *